(12) United States Patent
Kobayashi et al.

(10) Patent No.: US 10,704,514 B2
(45) Date of Patent: Jul. 7, 2020

(54) FUEL SUPPLY DEVICE

(71) Applicant: DENSO CORPORATION, Kariya, Aichi-pref. (JP)

(72) Inventors: Kiyomori Kobayashi, Kariya (JP); Rui Adachi, Kariya (JP); Norihiro Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 100 days.

(21) Appl. No.: 16/093,749

(22) PCT Filed: Mar. 30, 2017

(86) PCT No.: PCT/JP2017/013162
§ 371 (c)(1),
(2) Date: Oct. 15, 2018

(87) PCT Pub. No.: WO2017/183407
PCT Pub. Date: Oct. 26, 2017

(65) Prior Publication Data
US 2019/0078541 A1    Mar. 14, 2019

(30) Foreign Application Priority Data

Apr. 20, 2016 (JP) .................................. 2016-84353

(51) Int. Cl.
*F02M 37/10* (2006.01)
*F02M 37/00* (2006.01)
*B60K 15/03* (2006.01)

(52) U.S. Cl.
CPC ........... *F02M 37/103* (2013.01); *B60K 15/03* (2013.01); *F02M 37/00* (2013.01);
(Continued)

(58) Field of Classification Search
CPC ...... F02M 37/00; F02M 37/10; F02M 37/103; F02M 37/106; B60K 2015/03243; B60K 2015/03453; B60K 2015/03467
See application file for complete search history.

(56) References Cited

U.S. PATENT DOCUMENTS 6,206,037 B1    3/2001    Murakoshi et al.
6,230,690 B1 *  5/2001    Umetsu ................ B60K 15/077
                                                    123/509
(Continued)

FOREIGN PATENT DOCUMENTS

JP    2003-097373        4/2003
JP    2012-184760        9/2012
JP    2012184760 A  *    9/2012

*Primary Examiner* — John M Zaleskas
(74) *Attorney, Agent, or Firm* — Nixon & Vanderhye PC

(57) ABSTRACT

A coupling stay includes a support inner peripheral surface extending along a rotational axis and providing radial support to a rotatable shaft portion of a pump unit, which extends along the rotational axis. A support lateral surface extends in a longitudinal direction and provides thrust support to the pump unit. The support inner peripheral surface extends from the support lateral surface in the transverse direction. A lock claw projects from the coupling stay. A lock projection projects from the pump unit and is operable to lock rotation of the pump unit relative to the coupling stay about the rotational axis upon fitting of the lock projection between the support lateral surface and the lock claw. A height of a contact part of the lock projection, which contacts the support lateral surface, is limited to be equal to or lower than the rotational axis.

9 Claims, 18 Drawing Sheets

(52) U.S. Cl.
CPC ........ *F02M 37/0017* (2013.01); *F02M 37/10* (2013.01); *B60K 2015/03111* (2013.01); *B60K 2015/03243* (2013.01); *B60K 2015/03453* (2013.01); *B60K 2015/03467* (2013.01)

(56) References Cited

U.S. PATENT DOCUMENTS

| | | | | |
|---|---|---|---|---|
| 6,598,594 B2* | 7/2003 | Takahashi | ............ | F02M 37/103 |
| | | | | 123/510 |
| 6,604,511 B2* | 8/2003 | Hazama | ............... | F02M 37/103 |
| | | | | 123/509 |
| 2001/0001963 A1* | 5/2001 | Murakoshi | ........... | B60K 15/077 |
| | | | | 137/565.34 |
| 2001/0047827 A1* | 12/2001 | Murakoshi | ........... | B60K 15/077 |
| | | | | 137/565.34 |
| 2002/0119056 A1* | 8/2002 | Appleton | ............ | F02M 37/106 |
| | | | | 417/360 |
| 2004/0074995 A1* | 4/2004 | Okada | .................. | B01D 35/027 |
| | | | | 239/533.1 |
| 2011/0011470 A1* | 1/2011 | Tokunaga | ................ | B62J 35/00 |
| | | | | 137/565.17 |
| 2016/0369756 A1* | 12/2016 | Ikeya | .................. | F02M 37/0047 |
| 2017/0248106 A1* | 8/2017 | Niwa | ................... | F02M 37/103 |
| 2017/0268470 A1* | 9/2017 | Murakoshi | ............. | F02M 37/00 |
| 2017/0268471 A1* | 9/2017 | Fukui | ................... | F02M 37/103 |
| 2017/0276105 A1* | 9/2017 | Kondo | .................. | F02M 37/00 |
| 2017/0328318 A1* | 11/2017 | Fukui | .................. | F02M 37/106 |
| 2017/0341510 A1* | 11/2017 | Kong | ..................... | F02M 37/10 |
| 2019/0017474 A1* | 1/2019 | Adachi | ............. | F02M 37/0082 |
| 2019/0024617 A1* | 1/2019 | Fukui | .................. | F02M 37/103 |
| 2019/0032614 A1* | 1/2019 | Fukuoka | ............. | F02M 37/106 |
| 2019/0047405 A1* | 2/2019 | Niwa | ................. | F02M 37/103 |
| 2019/0136809 A1* | 5/2019 | Fujiseki | ............. | F02M 37/106 |
| 2019/0211785 A1* | 7/2019 | Akiba | .................. | F02M 37/00 |

* cited by examiner

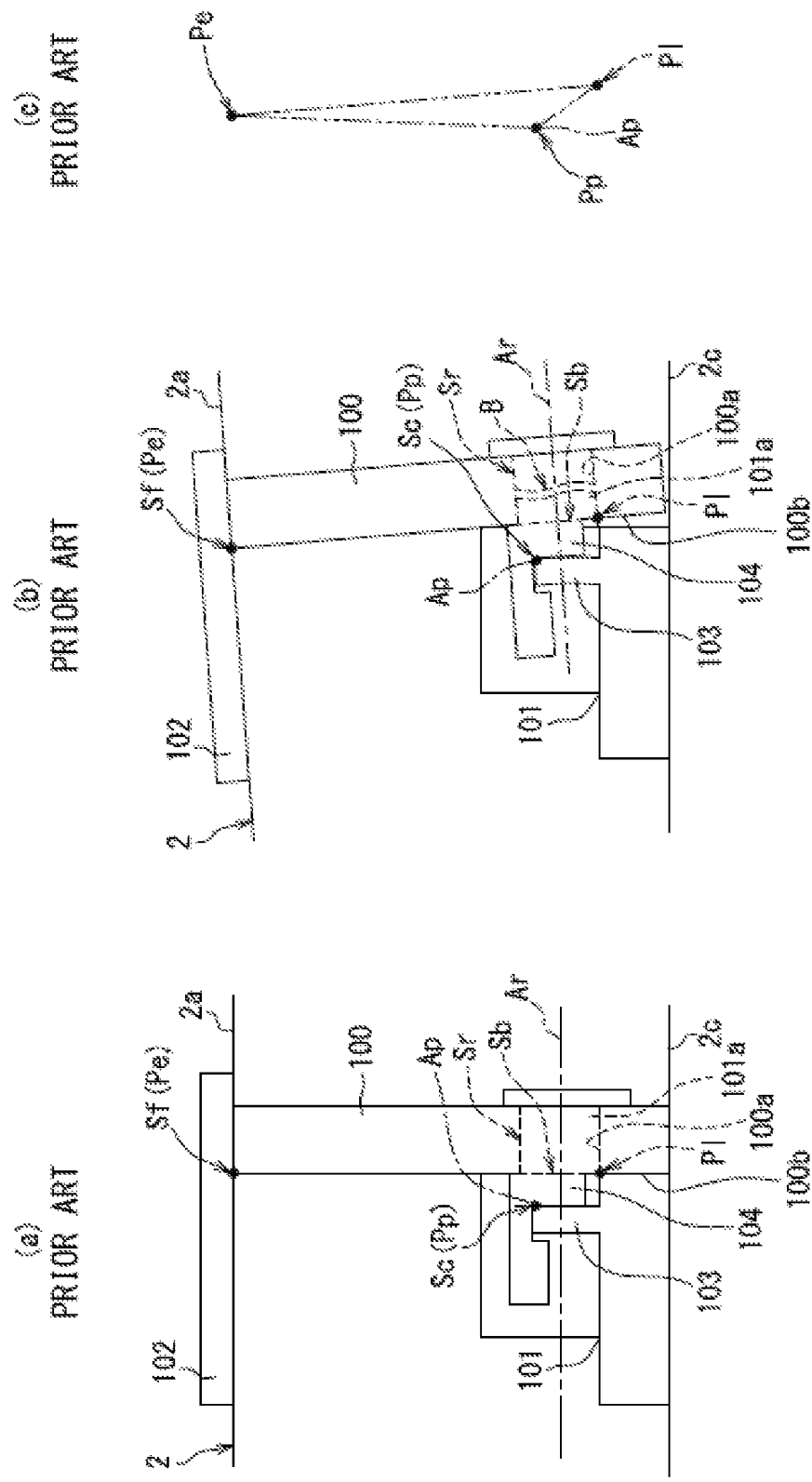

FUEL SUPPLY DEVICE

CROSS REFERENCE TO RELATED APPLICATION

This application is the U.S. national phase of International Application No. PCT/JP2017/013162 filed on Mar. 30, 2017 which designated the U.S. and claims priority to Japanese Patent Application No. 2016-84353 filed on Apr. 20, 2016, the entire contents of each of which are hereby incorporated by reference.

TECHNICAL FIELD

The present disclosure relates to a fuel supply device that is configured to supply fuel from an inside of a fuel tank to an internal combustion engine.

BACKGROUND ART

Previously, an in-tank fuel supply device, which is placed in the inside of the fuel tank, is widely used at the internal combustion engine of a vehicle. In the device, which is disclosed in the patent literature 1 as this kind of fuel supply device, a coupling stay couples between a cover body, which is installed to an upper wall of the fuel tank, and a pump unit, which is placed on a bottom wall of the fuel tank and is operable to discharge the fuel from the inside of the fuel tank toward the internal combustion engine.

In the device disclosed in the patent literature 1, the coupling stay provides radial support and thrust support to the pump unit. Under this supporting state, a wall portion, which projects from the pump unit, can be fitted between a longitudinal bar, which projects from the coupling stay, and a projection of the coupling stay, to lock rotation of the pump unit about a rotational axis relative to the coupling stay. The rotation of the pump unit relative to the coupling stay is used at the time of inserting the fuel supply device into the inside of the fuel tank and thereby needs to be limited by the locking after the insertion of the fuel supply device into the inside of the fuel tank.

However, in the device disclosed in the patent literature 1, the fuel tank expands and contracts in response to repeating of operation and stop of the internal combustion engine. Therefore, the pump unit 101 and the cover body 102, which are schematically indicated in FIGS. 18(a) and 18(b), respectively follow the bottom wall 2c and the upper wall 2a of the fuel tank 2. Thereby, the pump unit 101 tries to tilt about an axis Ap, which crosses the rotational axis Ar, toward the coupling stay 100.

At this time, when a point Sf, at which a load is applied from the cover body 102 to the coupling stay 100, is defined as a point of effort Pe, a contact part Sc, at which a wall portion 103 projected from the pump unit 101 contacts the projection 104 of the coupling stay 100, forms a fulcrum Pp. Therefore, at a radial support part Sr, at which the pump unit 101 receives the radial support from a hole inner peripheral surface 100a of the coupling stay 100, a boundary Sb between a lateral surface 100b of the coupling stay 100, which provides the thrust support to the pump unit 101, and a hole inner peripheral surface 100a forms a point of load Pl where a force is applied to the rotatable shaft portion 101a, as shown in FIG. 18(c). In FIG. 18(c), in order to ease the understanding of the description, only a part of the boundary Sb is indicated as the point of load Pl.

Here, in the device disclosed in the patent literature 1, as illustrated in FIG. 18(a), the contact part Sc between the wall portion 103 and the projection 104 is assumed to be deviated related to the boundary Sb between the hole inner peripheral surface 100a and the lateral surface 100b at the radial support part Sr in a transverse direction along the rotational axis Ar. Specifically, the fulcrum Pp and the point of load Pl are deviated from each other in the transverse direction. Therefore, the amount of displacement of the point of load Pl about the fulcrum Pp is increased in response to the tilting of the pump unit 101. Furthermore, the contact part Sc extends to a location, which is higher than the rotational axis Ar in the longitudinal direction, so that the fulcrum Pp is placed to be closer to the point of effort Pe than the point of load Pl. Therefore, a pulling force, which pulls the rotatable shaft portion 101a from the pump unit 101 side, becomes dominant at the point of load Pl. Because of the above configuration, a breakage of the rotatable shaft portion 101a at the radial support part Sr may possibly occur, as illustrated in FIG. 18(b).

CITATION LIST

Patent Literature

PATENT LITERATURE 1: JP2012-184760A

SUMMARY OF INVENTION

The present disclosure is made in view of the above disadvantage, and it is an objective of the present disclosure to provide a fuel supply device that can limit a breakage at a radial support part of a coupling stay that provides radial support to a pump unit.

In order to address the above objective, according to a first aspect of the present disclosure, there is provided a fuel supply device that is configured to supply fuel from an inside of a fuel tank to an internal combustion engine, the fuel supply device including:

a cover body that is installed to an upper wall of the fuel tank;

a pump unit, in which one of a rotatable shaft portion and a support inner peripheral surface is formed to extend along a rotational axis that extends in a transverse direction, wherein the pump unit is placed on a bottom wall of the fuel tank and discharges the fuel, which is in the inside of the fuel tank, toward the internal combustion engine;

a coupling stay, in which another one of the rotatable shaft portion and the support inner peripheral surface is formed to extend along the rotational axis, wherein:

the coupling stay couples between the cover body and the pump unit;

the another one of the rotatable shaft portion and the support inner peripheral surface provides radial support to the one of the rotatable shaft portion and the support inner peripheral surface;

a support lateral surface of the coupling stay, which extends in a longitudinal direction of the coupling stay, provides thrust support to the pump unit; and the another one of the rotatable shaft portion and the support inner peripheral surface extends from the support lateral surface in the transverse direction;

a lock claw that projects from the coupling stay; and a lock projection that projects from the pump unit and is operable to lock rotation of the pump unit relative to the coupling stay about the rotational axis upon fitting of the lock projection between the support lateral surface and the lock claw, wherein a height of a contact part of the lock projection, which contacts the support lateral surface, is limited to be equal to or lower than the rotational axis in the longitudinal direction.

According to the first aspect of the present disclosure, the coupling stay provides the radial support and the thrust support to the pump unit as follows. Specifically, with respect to the rotatable shaft portion and the support inner peripheral surface, both of which extend along the rotational axis in the transverse direction, the one of the rotatable shaft portion and the support inner peripheral surface formed at the pump unit receives the radial support from the another one of the rotatable shaft portion and the support inner peripheral surface formed at the coupling stay and receives the thrust support from the support lateral surface that extends in the longitudinal direction. Under this supporting state, the lock projection, which projects from the pump unit, is fitted between the lock claw, which projects from the coupling stay, and the support lateral surface, so that the rotation of the pump unit about the rotational axis relative to the coupling stay can be locked. According to the first aspect of the present disclosure, the contact part, at which lock projection contacts the support lateral surface, is positioned at the height that is equal to or lower than the rotational axis. With this configuration, even when the pump unit tries to tilt toward the coupling stay about an axis, which extends in another transverse direction that crosses the rotational axis, due to expansion and contraction of the fuel tank, a breakage can be limited. This limiting principle will be described below.

When the pump unit tries to tilt in response to the expansion and contraction of the fuel tank, the pump unit and the cover body respectively follow the bottom wall and the upper wall of the fuel tank. At this time, when a point, at which a load is applied from the cover body to the coupling stay, is defined as a point of effort, the contact part, at which the lock projection projected from the pump unit contacts the support lateral surface, forms a fulcrum. Therefore, at the radial support part, at which the pump unit receives the radial support from the coupling stay, a boundary between the another one of the rotatable shaft portion and the support inner peripheral surface and the support lateral surface forms a point of load where the force is applied to the rotatable shaft portion.

Here, according to the first aspect of the present disclosure, the boundary of the radial support part and the contact part between the lock projection and the support lateral surface are not likely displaced in the transverse direction along the rotational axis. Therefore, the fulcrum and the point of load may appear substantially along a common plane. Furthermore, according to the first aspect of the present disclosure, the height of the contact part between the lock projection and the support lateral surface is limited to the height that is equal to or lower than the rotational axis, so that the point of load may appear between the point of effort and the fulcrum in the longitudinal direction. Accordingly, the amount of displacement of the point of load about the fulcrum is reduced, and an urging force, which urges the rotatable shaft portion toward the pump unit side, becomes dominant at the point of load. Thereby, it is possible to limit the breakage of the rotatable shaft portion at the radial support part.

The coupling stay according to a second aspect of the present disclosure includes a resilient support portion, which has the another one of the rotatable shaft portion and the support inner peripheral surface and is resiliently deformable.

In the coupling stay according to the second aspect of the present disclosure, the radial support part is formed by the resilient support portion that has the another one of the rotatable shaft portion and the support inner peripheral surface and is resiliently deformable. Accordingly, a pulling force, which is applied to the rotatable shaft portion at the boundary of the radial support part, can be reduced by the resilient deformation of the resilient support portion. Thereby, it is possible to improve a breakage limiting effect for limiting the breakage of the rotatable shaft portion at the radial support part.

BRIEF DESCRIPTION OF DRAWINGS

The present disclosure, together with additional objectives, features and advantages thereof, will be best understood from the following description in view of the accompanying drawings.

FIGS. 18(*a*) to 18(*c*) are schematic diagrams for describing a disadvantage of a previously proposed technique.

DESCRIPTION OF EMBODIMENTS

Hereinafter, various embodiments of the present disclosure will be described with reference to drawings. In the following respective embodiments, corresponding structural elements are indicated by the same reference signs and may not be redundantly described in some cases. In a case where only a part of a structure is described in each of the following embodiments, the rest of the structure of the embodiment may be the same as that of previously described one or more of the embodiments. Besides the explicitly described combination(s) of structural components in each of the following embodiments, the structural components of different embodiments may be partially combined even though such a combination(s) is not explicitly described as long as there is no problem.

First Embodiment

Figure 1:
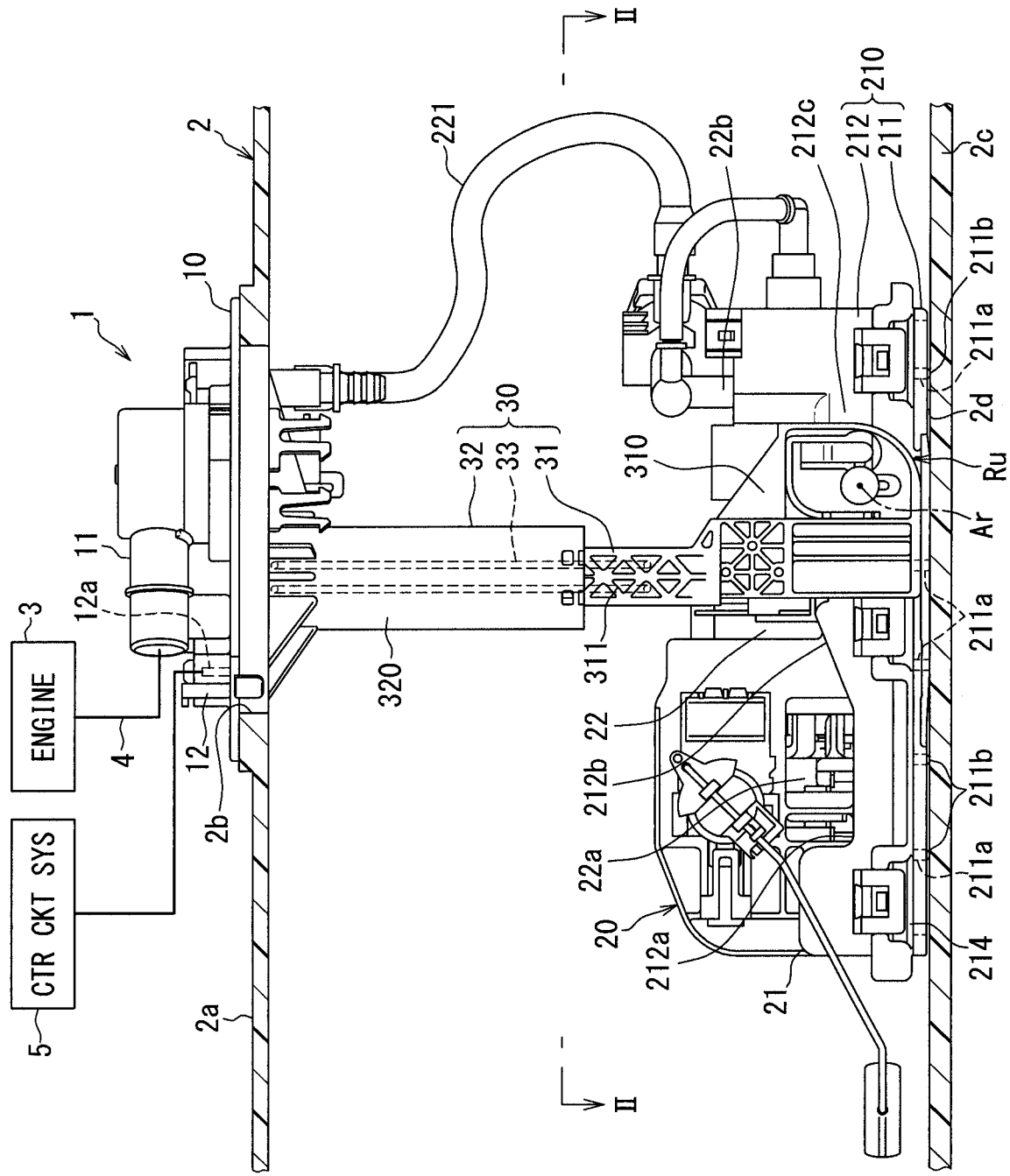
FIG. 1 is a front view of a fuel supply device according to a first embodiment.

As shown in FIG. 1, a fuel supply device 1 according to a first embodiment of the present disclosure is installed to a fuel tank 2 and is thereby applied to an internal combustion engine 3 of a vehicle. The fuel supply device 1 is configured to supply fuel, which is stored in the fuel tank 2, to the internal combustion engine 3 located at an outside of the fuel tank 2. Here, the fuel tank 2 is made of resin or metal and is shaped into a hollow form. An insertion hole 2b extends through an upper wall 2a of the fuel tank 2. The fuel supply device 1 is inserted into an inside of the fuel tank 2 through the insertion hole 2b. Under the above-described inserted state, the internal combustion engine 3, which is a supply destination of the fuel from the fuel supply device 1, may be a gasoline engine or a diesel engine. A longitudinal direction and a transverse direction(s) of FIG. 1, which shows the inserted state of the fuel supply device 1 in the fuel tank 2, are respectively defined to correspond with a vertical direction and a horizontal direction(s) of the vehicle placed on a horizontal plane.

(Overall Structure)

First of all, an overall structure of the fuel supply device 1 will be described. The fuel supply device 1 includes a cover body 10, a pump unit 20 and a coupling stay 30.

The cover body 10 is made of resin and is shaped into a circular plate form. The cover body 10 is installed to the upper wall 2a of the fuel tank 2. With this installation, the cover body 10 closes the insertion hole 2b. The cover body 10 integrally has a fuel supply pipe 11 and an electrical connector 12. The fuel supply pipe 11 is communicated with the pump unit 20 in the inside of the fuel tank 2. The fuel supply pipe 11 is communicated with a fuel path 4 that extends from the fuel tank 2 to the internal combustion engine 3 at the outside of the fuel tank 2. Under this communicating state, when the pump unit 20 discharges the fuel, which is suctioned from the inside of the fuel tank 2, toward the internal combustion engine 3 located at the outside of the fuel tank 2, the discharged fuel is supplied from the fuel supply pipe 11 to the internal combustion engine 3 through the fuel path 4.

The electrical connector 12 receives a plurality of metal terminals 12a. Each metal terminal 12a is electrically connected to a fuel pump 22 of the pump unit 20 in the inside of the fuel tank 2. Each metal terminal 12a is electrically connected to a control circuit system 5, such as an ECU, at the outside of the fuel tank 2. Under this electrically connected state, an operation of the fuel pump 22 is controlled based on a control signal(s) outputted from the control circuit system 5 through the respective metal terminals 12a.

Figure 2:
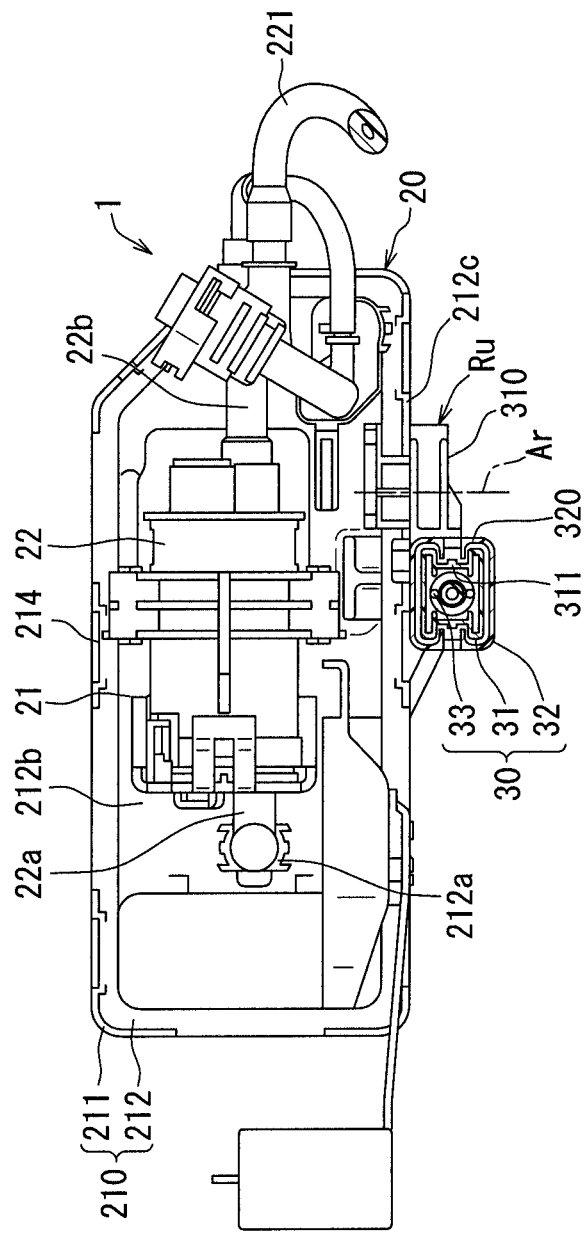
FIG. 2 is a cross-sectional view taken along line II-II in FIG. 1.

The pump unit 20 is placed on the lower side of the cover body 10 in the inside of the fuel tank 2. As shown in FIGS. 1 and 2, the pump unit 20 includes a unit main body 21 and the fuel pump 22. The unit main body 21 is shaped into a flat rectangular box form as a whole and is placed on a bottom wall 2c of the fuel tank 2. A sub-tank 210 of the unit main body 21 includes a lower member 211 and an upper member 212, which are assembled together to form the sub-tank 210.

The lower member 211 is made of resin and is shaped into a flat plate form. A plurality of inflow holes 211a extends through the lower member 211 in the longitudinal direction. A plurality of projections 211b downwardly projects from the lower member 211. Each projection 211b contacts the bottom wall 2c of the fuel tank 2 from the upper side of the bottom wall 2c, so that an inflow gap 2d is formed between the lower member 211 and the bottom wall 2c. The fuel in the fuel tank 2 flows into each inflow hole 211a through the inflow gap 2d.

The upper member 212 is made of resin and is shaped into an inverted cup form. An outer periphery of the upper member 212 is fixed to an outer periphery of the lower member 211 (see, for example, FIG. 7). A through-hole 212a extends through a portion of the upper member 212 in the longitudinal direction. The fuel in the fuel tank 2 flows into an inside of the upper member 212 through the through-hole 212a and is stored in the sub-tank 210.

A filter screen 214 of the unit main body 21 is made of a material, such as a porous resin, a woven fabric, an unwoven fabric, a resin mesh or a metal mesh, which has a filtering function. The filter screen 214 is shaped into a flat rectangular bag form. An outer periphery of the filter screen 214 is clamped between the lower member 211 and the upper member 212 (see, for example, FIG. 7). Under this clamped state, the fuel, which flows from the inside of the fuel tank 2 into the respective inflow holes 211a and the inside of the upper member 212, is filtered through the filter screen 214. The filtered fuel is suctioned from the inside of the filter screen 214 into the fuel pump 22.

The fuel pump 22 is, for example, an electric pump, such as a vane pump or a trochoid pump. The fuel pump 22 is shaped into a cylindrical form that is oriented to extend in one transverse direction. The fuel pump 22 is fixed to an upper portion 212b of the upper member 212 of the unit main body 21. The fuel pump 22 is electrically connected to the respective metal terminals 12a through a flexible wiring that is flexible. In a state where a suction port 22a of the fuel pump 22 is inserted into the inside of the upper member 212 through the through-hole 212a, the suction port 22a of the fuel pump 22 is communicated with the inside of the filter screen 214. A discharge port 22b of the fuel pump 22 is communicated with the fuel supply pipe 11 through a flexible tube 221 that is flexible. The fuel pump 22 is driven according to the control signal outputted from the control circuit system 5, so that the fuel pump 22 suctions the filtered fuel that is present in the inside of the filter screen 214. The fuel pump 22 discharges the suctioned fuel toward the internal combustion engine 3.

The coupling stay 30 is received in the inside of the fuel tank 2. The coupling stay 30 solely couples between the cover body 10 and the pump unit 20. The pump unit 20 is installed to the coupling stay 30 such that the pump unit 20 is rotatable about a rotational axis Ar that is assumed to extend in another transverse direction. Under this installed state, rotational positions of the pump unit 20 relative to the coupling stay 30 includes an operating rotational position Ru shown in FIGS. 1 and 2 and a reference rotational position Rb shown in FIGS. 3 and 4.

Figure 3:
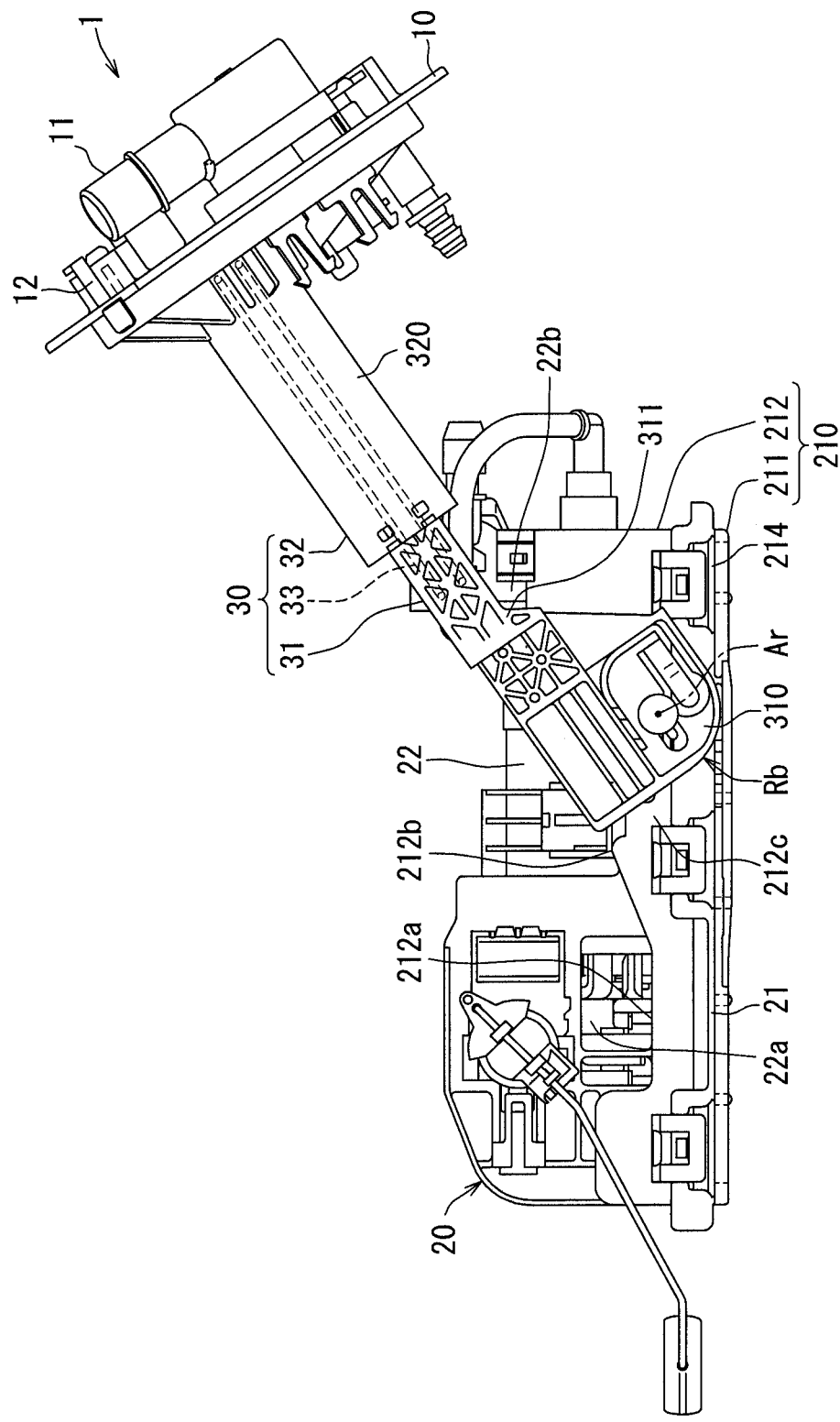
FIG. 3 is a front view showing a state of the fuel supply device that is different from the state of the fuel supply device shown in FIG. 1 according to the first embodiment.
Figure 4:
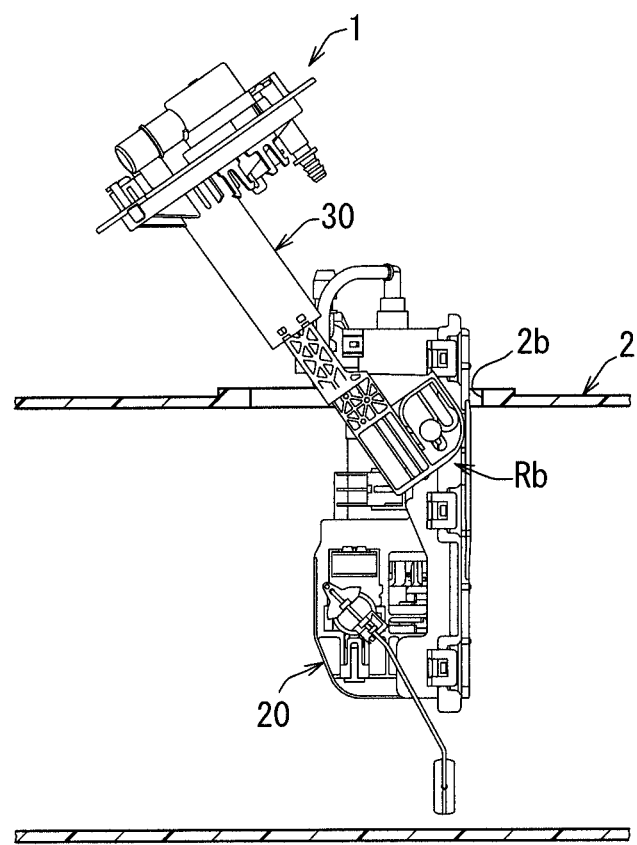
FIG. 4 is a schematic diagram showing an inserting method of the fuel supply device into a fuel tank according to the first embodiment.

Specifically, the operating rotational position Ru is a rotational position of the pump unit 20 where the pump unit 20 is bent generally at a right angle relative to the coupling stay 30, which extends in the longitudinal direction in the inserted state of the fuel supply device 1 that is inserted into the inside of the fuel tank 2 as shown in FIG. 1, so that the pump unit 20 is placed on the bottom wall 2c of the fuel tank 2. In contrast, the reference rotational position Rb is a rotational position of the pump unit 20 where the pump unit 20 is less bent relative to the coupling stay 30 in comparison to the operating rotational position Ru before the time of inserting the fuel supply device 1 into the inside of the fuel tank 2, as shown in FIG. 3. At the reference rotational position Rb, as shown in FIG. 4, the entire fuel supply device 1 can be inserted from the pump unit 20 side into the fuel tank 2 through the insertion hole 2b.

As shown in FIGS. 1 and 2, the coupling stay 30 includes a lower stay 31, an upper stay 32 and a resilient member 33. The lower stay 31 includes a rotatable plate segment 310 and a lower column segment 311, which are combined together to form the lower stay 31. The rotatable plate segment 310 is made of resin and is shaped into a flat plate form that extends in both the longitudinal direction and the one transverse direction. The rotatable plate segment 310 is installed to a lateral section 212c of the upper member 212 of the unit main body 21 such that the rotatable plate segment 310 is rotatable relative to the lateral section 212c about the rotational axis Ar. The lower column segment 311 is made of resin and is shaped into a rectangular column form that extends in the longitudinal direction.

The upper stay 32 includes an upper tube segment 320 as a main component. The upper tube segment 320 is made of resin and is shaped into a rectangular tubular form that extends in the longitudinal direction. The upper tube segment 320 downwardly extends from the cover body 10. The lower column segment 311 is slidably fitted into the upper tube segment 320 from the lower side of the upper tube segment 320.

The resilient member 33 is made of metal and is shaped into a form of a coil spring. The resilient member 33 is received such that the resilient member 33 extends between the inside of the upper tube segment 320 and the inside of the lower column segment 311, so that the resilient member 33 is clamped between the upper tube segment 320 and the lower column segment 311. In the state where the resilient member 33 is engaged to the upper tube segment 320, the resilient member 33 exerts a restoring force against the lower column segment 311 in a downward direction that is a direction toward the bottom wall 2c of the fuel tank 2. Each of the projections 211b of the unit main body 21 is urged against the bottom wall 2c of the fuel tank 2 by this restoring force. Therefore, a relative position between the lower stay 31 and the upper stay 32 changes in response to expansion and contraction of the fuel tank 2, so that a breakage of the coupling stay 30 is limited.

(Support Structure)

Figure 5:
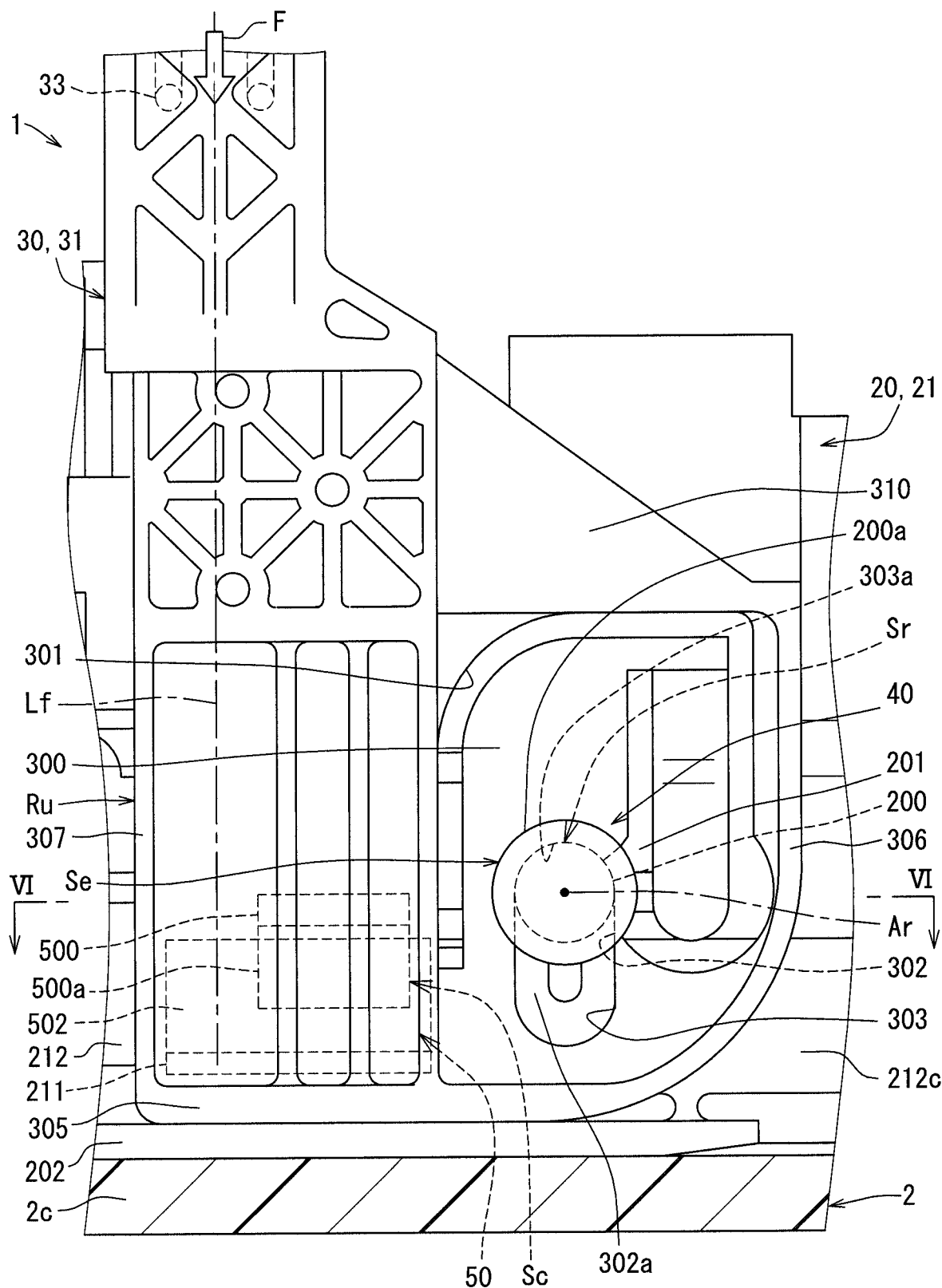
FIG. 5 is a front view showing a portion of FIG. 1 in a magnified scale.
Figure 6:
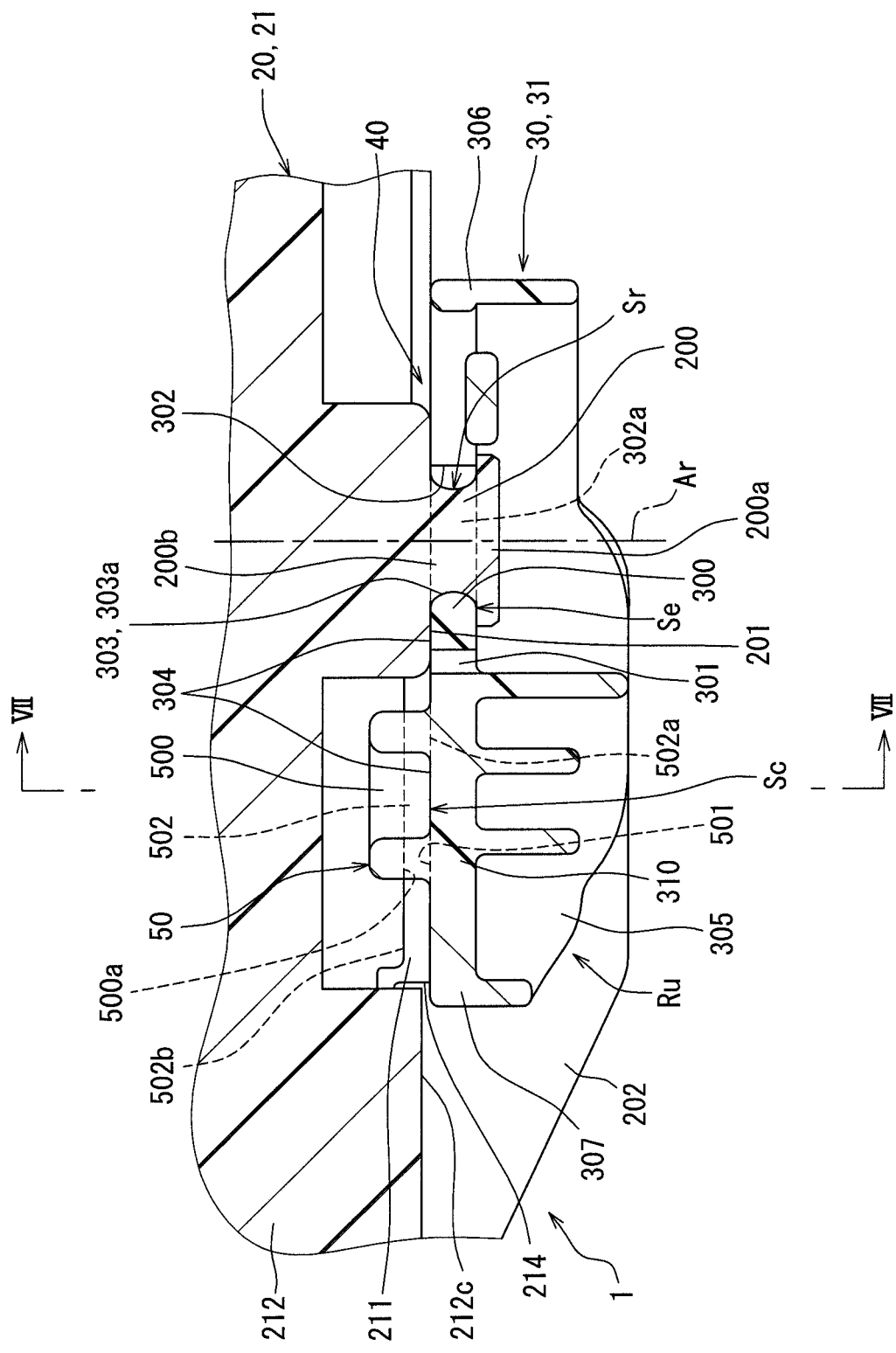
FIG. 6 is a cross-sectional view taken along line VI-VI in FIG. 5.

Next, a configuration of a support structure 40 of the pump unit 20 that provides radial support and thrust support to the coupling stay 30 will be described in detail. As shown in FIGS. 5 and 6, the support structure 40 includes: a rotatable shaft portion 200, a contact surface portion 201 and an interposing portion 202 of the pump unit 20; and a resilient support portion 300 of the coupling stay 30.

The rotatable shaft portion 200 is shaped into a cylindrical column form and projects in the other transverse direction along the rotational axis Ar from the lateral section 212c of the upper member 212 of the unit main body 21 of the pump unit 20. Specifically, the rotatable shaft portion 200, which projects along the rotational axis Ar that extends in the other transverse direction, is formed at the lateral section 212c of the pump unit 20. A projecting side distal end part 200a of the rotatable shaft portion 200, which is located at a projecting side of the rotatable shaft portion 200, is formed as an outer flange that is in a form of a circular flat plate and has an outer diameter, which is larger than the rest of the rotatable shaft portion 200. A portion of the lateral section 212c of the upper member 212, which surrounds a proximal end part 200b of the rotatable shaft portion 200, forms the contact surface portion 201 that is in a form of a planar surface, which is substantially perpendicular to the rotational axis Ar.

At the lower stay 31 of the coupling stay 30, the resilient support portion 300 is formed at the rotatable plate segment 310, which is in the flat plate form and extends substantially perpendicular to the rotational axis Ar. A slit 301, which extends generally in a form of an inverted U-shape, penetrates through the rotatable plate segment 310 in the other transverse direction, so that the resilient support portion 300 is resiliently deformable.

As shown in FIG. 6, a lateral surface of a portion of the rotatable plate segment 310, which includes the resilient support portion 300, forms a support lateral surface 304 that extends in the longitudinal direction. The support lateral surface 304 is in a form of a planar surface that is substantially perpendicular to the rotational axis Ar. The support lateral surface 304 makes surface to surface contact with the contact surface portion 201, so that the support lateral surface 304 provides the thrust support to the pump unit 20 in the other transverse direction. In this way, the support lateral surface 304 is slidable relative to the contact surface portion 201 at the time of rotating the pump unit 20 relative to the coupling stay 30.

Figure 7:
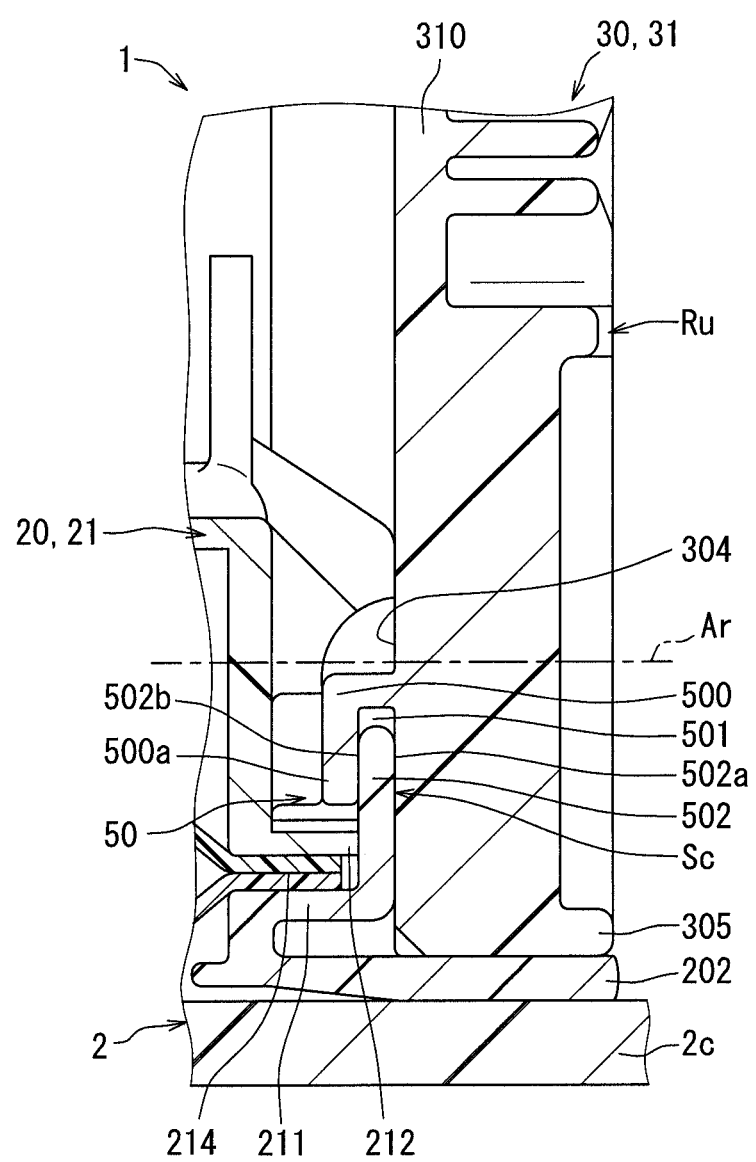
FIG. 7 is a cross-sectional view taken along line VII-VII in FIG. 6.

As shown in FIGS. 5 to 7, an end part of the resilient support portion 300 of the rotatable plate segment 310 forms a lower end part 305 of the coupling stay 30. Here, the interposing portion 202, which is in a flat plate form that extends in the one transverse direction at the lower member 211, is formed at the unit main body 21 of the pump unit 20. At the operating rotational position Ru, the interposing portion 202 is interposed between the lower end part 305 of the coupling stay 30 and the bottom wall 2c of the fuel tank 2.

As shown in FIGS. 5 and 6, an elongated hole 302, which is elongated in the longitudinal direction that is substantially perpendicular to the rotational axis Ar, extends through the resilient support portion 300 in the other transverse direction. Thereby, an inner peripheral surface of the elongated hole 302 forms a support inner peripheral surface 303 that extends from the support lateral surface 304. Specifically, the support inner peripheral surface 303, which extends along the rotational axis Ar in the other transverse direction, is formed in the elongated hole 302 of the coupling stay 30. At an upper end part of the elongated hole 302, which is located on an opposite side that is opposite from the bottom wall 2c of the fuel tank 2, a portion of the support inner peripheral surface 303 is formed as a journal surface portion 303a. The journal surface portion 303a is in a form of a semicircle arcuate surface that extends around the rotational axis Ar.

The rotatable shaft portion 200 is coaxially fitted to a radially inner side of the journal surface portion 303a at the resilient support portion 300. In this way, the support inner peripheral surface 303 provides the radial support to the pump unit 20, which has the rotatable shaft portion 200 fitted to the journal surface portion 303a, from a radially outer side such that the pump unit 20 is rotatable about the rotational axis Ar. Specifically, the rotatable shaft portion 200 is fitted to the journal surface portion 303a of the support inner peripheral surface 303 to form a radial support part Sr that provides the radial support to the rotatable shaft portion 200. Among two opposed peripheral edge parts 306, 307 of the rotatable plate segment 310, between which the rotational axis Ar is interposed in the one transverse direction, the radial support part Sr of the present embodiment is spaced by a predetermined distance from the peripheral edge part 306, which forms the resilient support portion 300, toward the rotational axis Ar.

Under this radially supporting state, a space 302a is formed on the lower side, i.e., the bottom wall 2c side of the rotatable shaft portion 200 in the elongated hole 302 of the resilient support portion 300. Furthermore, at the opposite side, which is opposite from the support lateral surface 304, the projecting side distal end part 200a of the rotatable shaft portion 200 is engaged to the resilient support portion 300 that is in the radially supporting state. Specifically, an engaging part Se between the rotatable shaft portion 200 and the coupling stay 30 is formed through the engagement between the projecting side distal end part 200a and the resilient support portion 300.

(Lock Structure)

Next, there will be described in detail a configuration of a lock structure 50 of the fuel supply device 1, which is configured to lock the rotation of the pump unit 20 relative to the coupling stay 30 at the operating rotational position Ru around the rotational axis Ar. As shown in FIGS. 5 to 7, the lock structure 50 includes: a lock claw 500 that projects from the coupling stay 30; and a lock projection 502 that projects from the pump unit 20.

The lock claw 500 projects from a portion of the support lateral surface 304 that does not form the resilient support portion 300 at the rotatable plate segment 310 of the lower stay 31 of the coupling stay 30. The lock claw 500 is shaped generally into an inverted L-form such that the lock claw 500 projects toward an opposite side, which is opposite from the location of the support inner peripheral surface 303 in the other transverse direction, and thereafter the lock claw 500 is downwardly bent in the longitudinal direction at the projecting side of the lock claw 500. Thereby, the lock claw 500 forms a gap 501 between the support lateral surface 304, which is substantially perpendicular to the rotational axis Ar, and a claw part 500a of the lock claw 500.

The lock projection 502 projects from an outer periphery of the lower member 211, which clamps the filter screen 214 in corporation with the upper member 212 in the unit main body 21 of the pump unit 20. The lock projection 502 is shaped into a flat plate form that upwardly projects in the longitudinal direction. At the operating rotational position Ru, the lock projection 502 is fitted into the gap 501 formed between the support lateral surface 304 and the lock claw 500. The lock projection 502, which is in this fitting state, makes a surface-to-surface contact relative to the support lateral surface 304 and the lock claw 500 through two surfaces 502a, 502b of the lock projection 502 that extend in the one transverse direction, which is substantially perpendicular to the rotational axis Ar, and the longitudinal direction, as shown in FIGS. 6 and 7. In this way, the rotation of the pump unit 20 relative to the coupling stay 30 can be locked through use of a frictional resistance between the respective contact surface parts.

Figure 8:
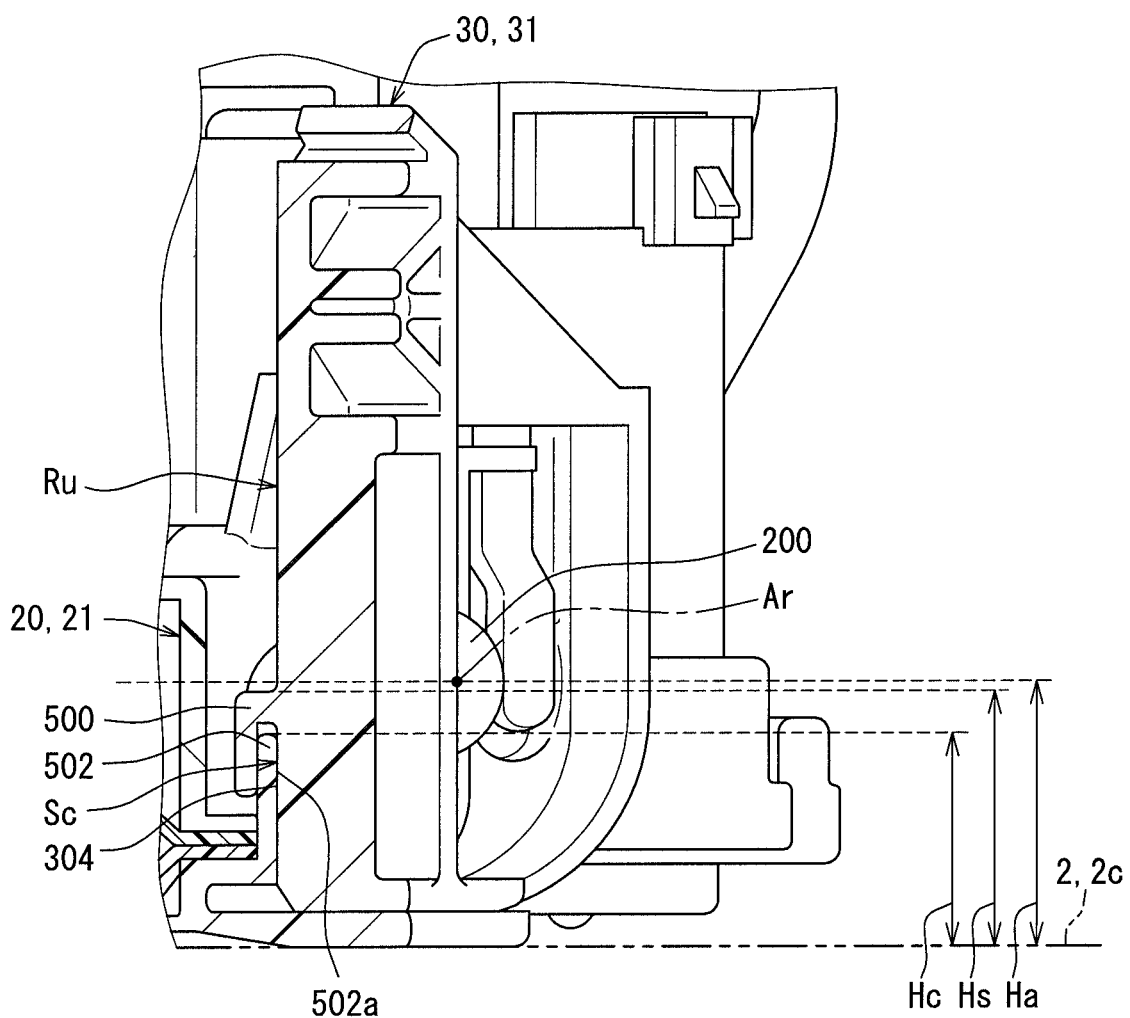
FIG. 8 is a perspective partial cross sectional view showing a positional relationship of a support structure and a lock structure shown in FIGS. 5 to 7.

As shown in FIGS. 5 to 8, in the present embodiment, a contact part Sc is defined as an actual contact part where the one surface 502a of the lock projection 502 actually contacts the support lateral surface 304. With reference to FIGS. 5 and 6, among the two opposed peripheral edge parts 306, 307 of the rotatable plate segment 310, between which the rotational axis Ar is interposed in the one transverse direction, the contact part Sc is decentered toward the peripheral edge part 307 side, at which the resilient support portion 300 is not formed. Furthermore, as shown in FIG. 8, the entire contact part Sc is limited to be within a range where a height Hc of the contact part Sc, which is measure from the bottom wall 2c of the fuel tank 2 in the longitudinal direction at the operating rotational position Ru, is equal to or lower than a height Ha of the rotational axis Ar measured from the bottom wall 2c of the fuel tank 2. Particularly in the present embodiment, the height Hc of the uppermost end of the contact part Sc is set to be lower than the height Ha of the rotational axis Ar in the longitudinal direction. Furthermore, in order to reliably implement the position of the contact part Sc described above, according to the present embodiment, a height Hs of an uppermost end of the lock claw 500 is also set to be lower than the height Ha of the rotational axis Ar in the longitudinal direction.

As shown in FIG. 5, a line of action Lf of a restoring force Fr, which is exerted from the resilient member 33 to the coupling stay 30, is set to extend in the longitudinal direction at the operating rotational position Ru. Thereby, according to the present embodiment, the line of action Lf of the restoring force F is displace in the one transverse direction at the operating rotational position Ru from a location between: the radial support part Sr of the coupling stay 30, which provides the radial support to the pump unit 20; and the contact part Sc between the lock projection 502 and the support lateral surface 304.

(Effects and Advantages)

Effects and advantages of the first embodiment will be described below.

Figure 9:
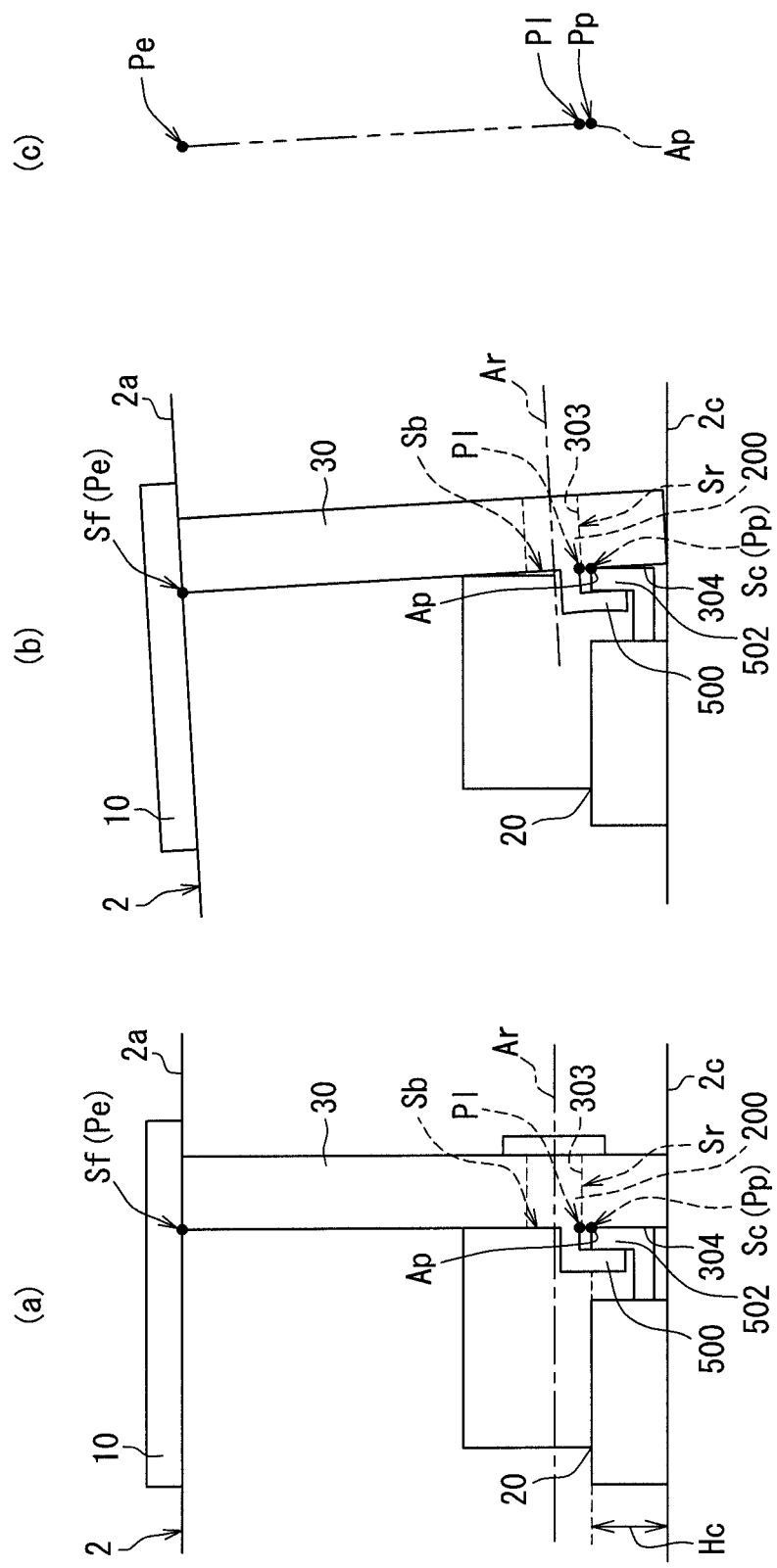
FIGS. 9(*a*) to 9(*c*) are schematic diagrams for describing effects and advantages of the fuel supply device of the first embodiment.

According to the first embodiment, as schematically shown in FIG. 9(a), the coupling stay 30 provides the radial support and the thrust support to the pump unit 20 as follows. Specifically, with respect to the rotatable shaft portion 200 and the support inner peripheral surface 303, both of which extend along the rotational axis Ar in the other transverse direction, one of the rotatable shaft portion 200 and the support inner peripheral surface 303 formed at the pump unit 20 receives the radial support from the other one of the rotatable shaft portion 200 and the support inner peripheral surface 303 formed at the coupling stay 30 and receives the thrust support from the support lateral surface 304 that extends in the longitudinal direction. Under this supporting state, the lock projection 502, which projects from the pump unit 20, is fitted between the lock claw 500, which projects from the coupling stay 30, and the support lateral surface 304, so that the rotation of the pump unit 20 about the rotational axis Ar relative to the coupling stay 30 can be locked. According to the first embodiment, the contact part Sc, at which the lock projection 502 contacts the support lateral surface 304, is positioned at the height Hc that is equal to or lower than the rotational axis Ar. With this configuration, even when the pump unit 20 tries to tilt toward the coupling stay 30 about an axis Ap, which extends in the one transverse direction that crosses the rotational axis Ar, due to expansion and contraction of the fuel tank 2 that is schematically indicated in FIG. 9(b), a breakage can be limited. This limiting principle will be described below.

When the pump unit 20 tries to tilt in response to the expansion and contraction of the fuel tank 2, the pump unit 20 and the cover body 10 respectively follow the bottom wall 2c and the upper wall 2a of the fuel tank 2. At this time, when a point Sf, at which a load is applied from the cover body 10 to the coupling stay 30, is defined as a point of effort Pe, the contact part Sc, at which the lock projection 502 projected from the pump unit 20 contacts the support lateral surface 304, forms a fulcrum Pp. Therefore, at the radial support part Sr, at which the pump unit 20 receives the radial support from the coupling stay 30, a boundary Sb between the support inner peripheral surface 303 and the support lateral surface 304 forms a point of load Pl where the force is applied to the rotatable shaft portion 200, as shown in FIG. 9(c). In FIG. 9(c), in order to ease the understanding of the description, only a part of the boundary Sb is indicated as the point of load Pl.

Here, according to the first embodiment illustrated in FIG. 9(a), the boundary Sb of the radial support part Sr and the contact part Sc between the lock projection 502 and the support lateral surface 304 are not likely displaced in the other transverse direction along the rotational axis Ar. Therefore, the fulcrum Pp and the point of load Pl may appear substantially along a common plane as indicated by a dot-dot-dahs line in FIG. 9(c). Furthermore, according to the first embodiment illustrated in FIG. 9(a), the height of the contact part Sc between the lock projection 502 and the support lateral surface 304 is limited to the height Hc that is equal to or lower than the rotational axis Ar, so that the point of load Pl may appear between the point of effort Pe and the fulcrum Pp in the longitudinal direction. Accordingly, the amount of displacement of the point of load Pl about the fulcrum Pp is reduced, and an urging force, which urges the rotatable shaft portion 200 toward the pump unit 20 side, becomes dominant at the point of load Pl. Thereby, it is possible to limit the breakage of the rotatable shaft portion 200 at the radial support part Sr.

Furthermore, in the coupling stay 30 of the first embodiment, the radial support part Sr is formed by the resilient support portion 300 that has the support inner peripheral surface 303 and is resiliently deformable. Accordingly, a force, which is applied to the rotatable shaft portion 200 at the boundary Sb of the radial support part Sr, can be reduced by the resilient deformation of the resilient support portion 300. Thereby, it is possible to improve the breakage limiting effect for limiting the breakage of the rotatable shaft portion 200 at the radial support part Sr.

Furthermore, according to the first embodiment, the rotatable shaft portion 200, which is formed at the pump unit 20, is fitted to the radially inner side of the support inner peripheral surface 303 that is formed at the coupling stay 30. Accordingly, the breakage of the rotatable shaft portion 200 can be limited at the radial support part Sr that is formed by the fitting of the rotatable shaft portion 200 to the support inner peripheral surface 303. Furthermore, according to the first embodiment, the rotatable shaft portion 200, which extends along the rotational axis Ar and is fitted to the radially inner side of the support inner peripheral surface 303, is configured such that the projecting side distal end part 200a of the rotatable shaft portion 200, which has the increased diameter, is engaged to the coupling stay 30 on the side that is opposite from the support lateral surface 304. Accordingly, the breakage of the rotatable shaft portion 200 can be limited not only at the radial support part Sr, which is formed by the support inner peripheral surface 303 and the rotatable shaft portion 200, but also at the engaging part Se formed by the coupling stay 30 and the rotatable shaft portion 200.

Furthermore, according to the first embodiment, in the coupling stay 30, the support inner peripheral surface 303, to which the rotatable shaft portion 200 is fitted at the radially inner side of the support inner peripheral surface 303, is placed in the state where the space 302a is formed by the support inner peripheral surface 303, which is the inner peripheral surface of the elongated hole 302, at the location that is on the fuel tank bottom wall 2c side of the rotatable shaft portion 200 in the elongated hole 302. Accordingly, when the pump unit 20 tries to tilt about the axis Ap, which extends in the one transverse direction that crosses the rotational axis Ar, the rotatable shaft portion 200 may be displaced in the elongated hole 302 toward the bottom wall 2c side. Thereby, at the radial support part Sr, which is formed by the support inner peripheral surface 303 and the rotatable shaft portion 200, the application of the force against the rotatable shaft portion 200 can be limited, so that the breakage limiting effect for limiting the breakage of the rotatable shaft portion 200 can be enhanced.

In addition, according to the first embodiment, the interposing portion 202 of the pump unit 20 is interposed between the fuel tank bottom wall 2c and the coupling stay 30, so that the phenomenon of tilting of the pump unit 20 about the axis Ap, which extends in the one transverse direction that crosses the rotational axis Ar, can be limited. Thereby, according to the first embodiment, in which this kind of limiting effect is additionally implemented, the breakage limiting effect for limiting the breakage of the rotatable shaft portion 200 at the radial support part Sr can be enhanced.

Second Embodiment

Figure 10:
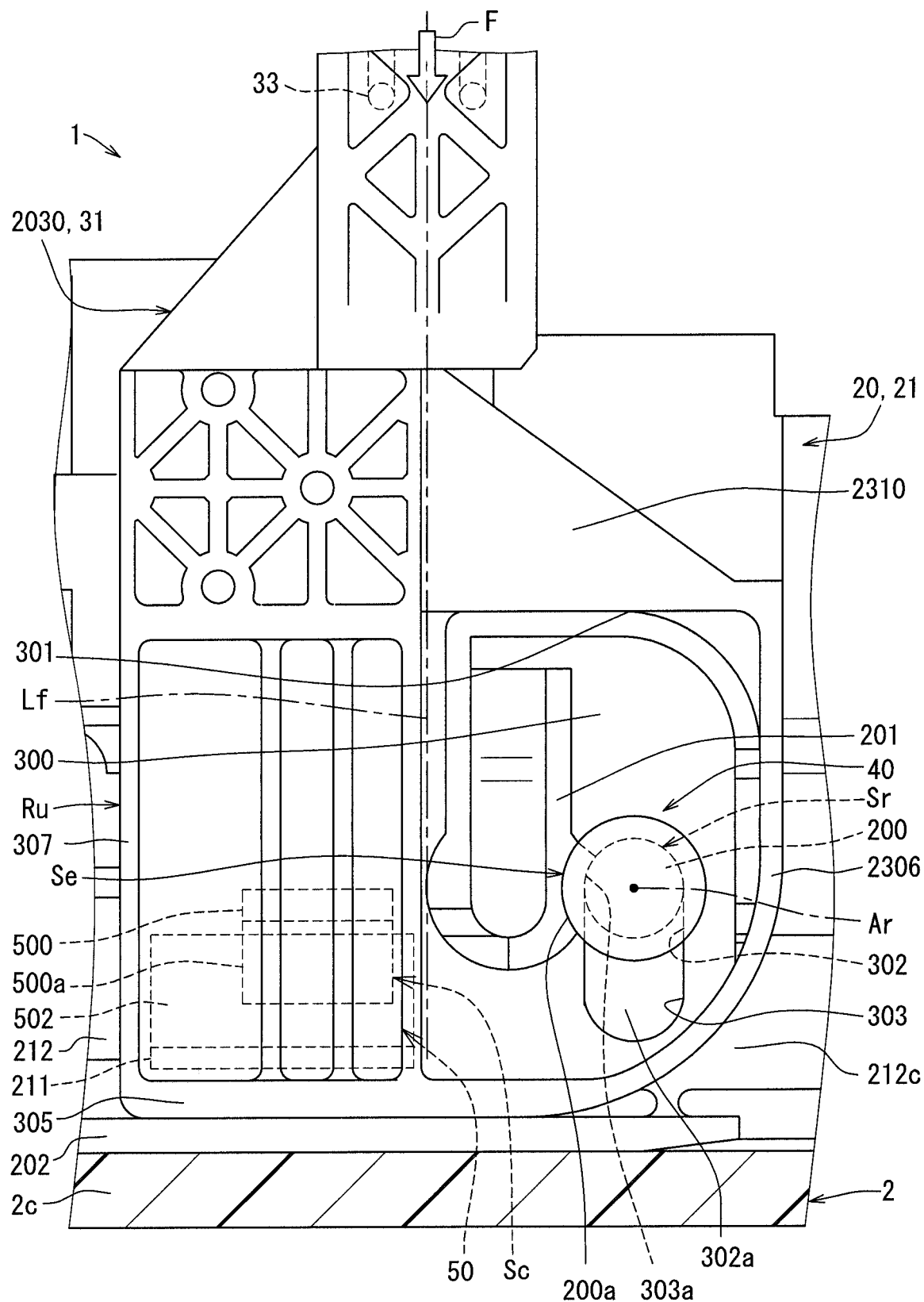
FIG. 10 is a front view showing a portion of a fuel supply device in a magnified scale according to a second embodiment.

As shown in FIG. 10, a second embodiment of the present disclosure is a modification of the first embodiment.

In the second embodiment, in a rotatable plate segment 2310 of a coupling stay 2030, among two opposed peripheral edge parts 2306, 307, between which the rotational axis Ar is interposed in the one transverse direction, the radial support part Sr is decentered toward the peripheral edge part 2306 side, at which the resilient support portion 300 is formed. Therefore, according to the second embodiment, the radial support part Sr and the contact part Sc are decentered toward the peripheral edge part 2306 side and the peripheral edge part 307 side, respectively, and are thereby separated from each other, so that the line of action Lf of the restoring force F extends at the location between the radial support part Sr and the contact part Sc.

According to the second embodiment, the line of action Lf of the restoring force F, which is exerted from the resilient member 33 to the coupling stay 2030, extends at the location between the radial support part Sr of the coupling stay 2030, which provides the radial support to the pump unit 20, and the contact part Sc between the lock projection 502 and the support lateral surface 304. Accordingly, the restoring force Fr of the resilient member 33, which is exerted to the fuel tank bottom wall 2c side, becomes a force that urges the pump unit 20 against the bottom wall 2c at the radial support part Sr and the contact part Sc, which are respectively located on the two opposite sides of the line of action Lf. Thereby, the pump unit 20 can be held on the bottom wall 2c, so that fuel supply characteristics for supplying the fuel to the internal combustion engine 3 can be further stabilized.

Furthermore, according to the second embodiment, the radial support part Sr and the contact part Sc are respectively decentered toward the peripheral edge part 2306 side and the peripheral edge part 307 side, between which the rotational axis Ar is interposed in the one transverse direction at the coupling stay 2030. Accordingly, the radial support part Sr and the contact part Sc are spaced from the line of action Lf of the restoring force F as much as possible, so that the urging state of the pump unit 20 against the fuel tank bottom wall 2c by the restoring force Fr is stabilized. Thereby, the pump unit 20 can be reliably held on the bottom wall 2c, so that the fuel supply characteristics for supplying the fuel to the internal combustion engine 3 can be stabilized.

Other Embodiments

Although the embodiments of the present disclosure have been described, the present disclosure should not be limited to the above embodiments and may be applied to various other embodiments and combinations of the embodiments without departing form the scope of the present disclosure. Hereinafter, FIGS. 11 to 13 and 15 to 17 indicate modifications with respect to the first embodiment, and FIG. 14 indicates a modification with respect to the second embodiment.

Figure 11:
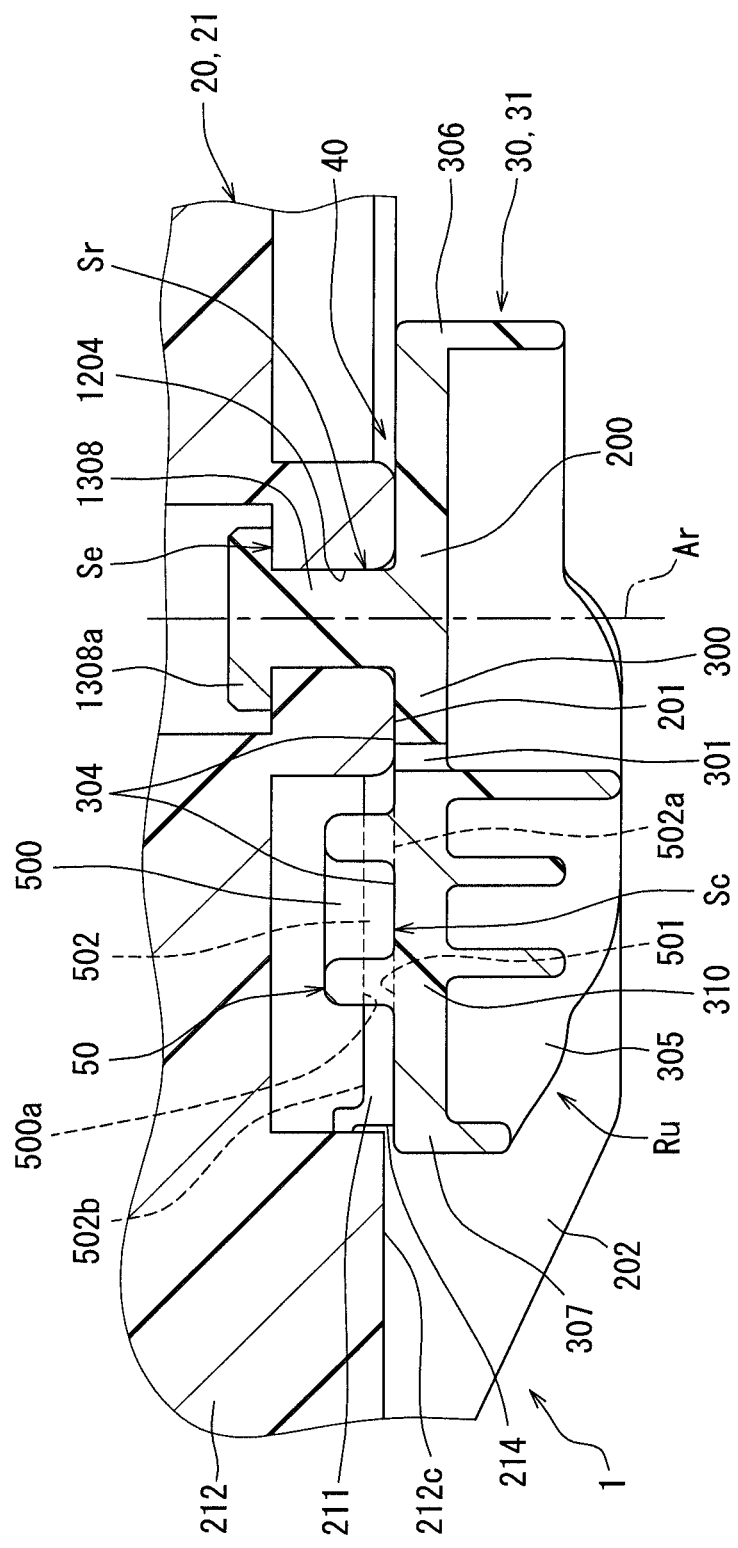
FIG. 11 is a front view showing a modification of FIG. 6.

Specifically, as a first modification with respect to the first and second embodiments, as shown in FIG. 11, a rotatable shaft portion 1308, which is formed in the coupling stay 30, 2030 and extends along the rotational axis Ar in the other transverse direction, may be constructed to receive the radial support from a support inner peripheral surface 1204, which is formed in the pump unit 20 and extends along the rotational axis Ar, and thereby the radial support part Sr is formed. In the first modification, the rotatable shaft portion 1308, which extends from the coupling stay 30, 2030 along the rotational axis Ar in the other transverse direction, is extended from the support lateral surface 304 in the other transverse direction. Also, in the first modification, a projecting side distal end part 1308a of the rotatable shaft portion 1308 is engaged to the pump unit 20, and thereby the engaging part Se is formed.

Figure 12:
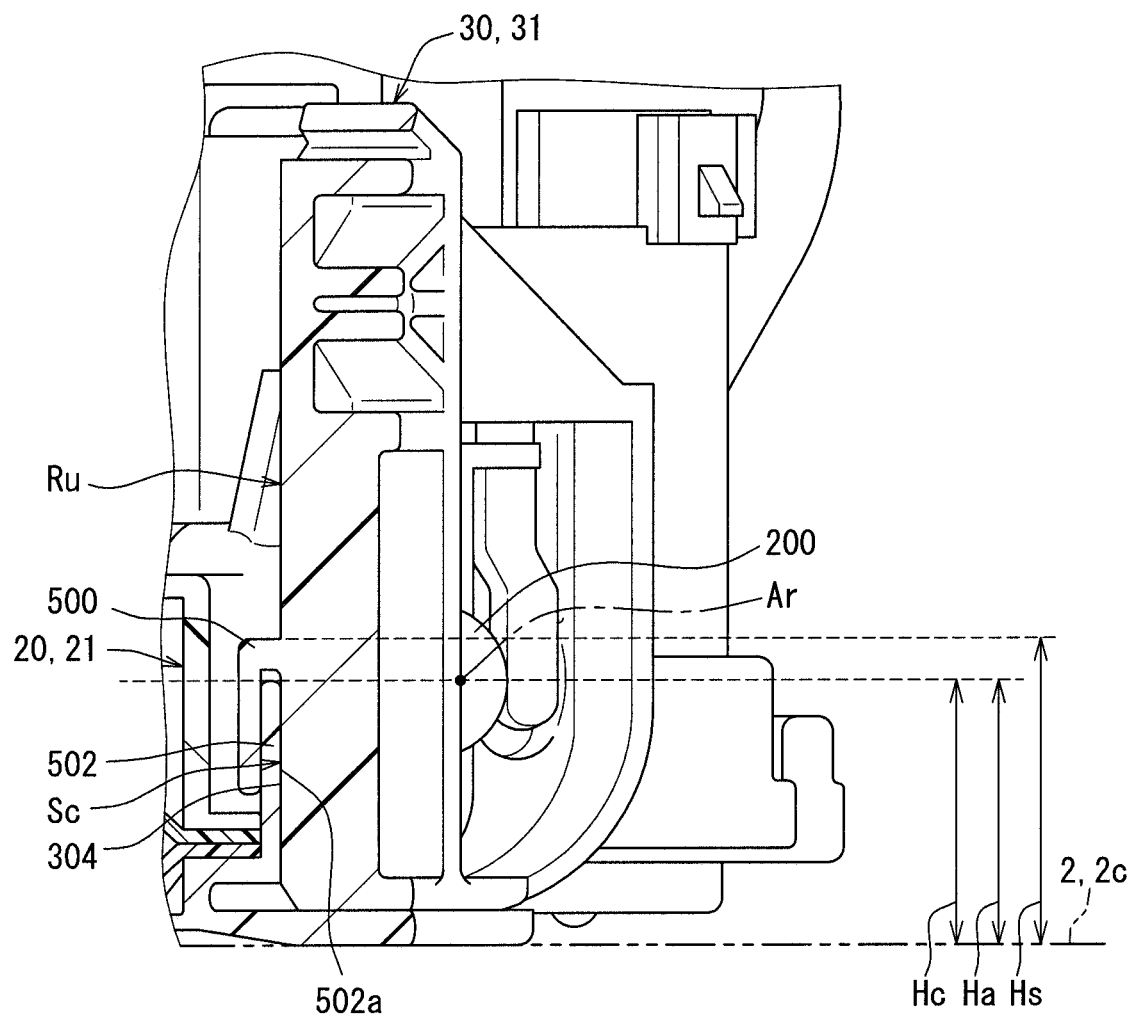
FIG. 12 is a front view showing a modification of FIG. 8.

As a second modification with respect to the first and second embodiments, as shown in FIG. 12, the height Hc of the uppermost end of the contact part Sc may substantially coincide with the height Ha of the rotational axis Ar in longitudinal direction of the operating rotational position Ru. In the second modification, the height Hs of the uppermost end of the lock claw 500 is set to be higher than the height Ha of the rotational axis Ar in the longitudinal direction.

As a third modification with respect to the first and second embodiments, the slit 301 may be eliminated from the coupling stay 30, 2030. In the third modification, the support portion 300, in which the resilient deformation is reduced or limited, provides the radial support to the pump unit 20, and thereby the radial support part Sr is formed. As a fourth modification of the first and second embodiments, the support inner peripheral surface 303, which is in a form of a cylindrical surface, may be formed by an inner peripheral surface of a cylindrical hole that extends through the coupling stay 30, 2030 along the rotational axis Ar in the other transverse direction, and thereby the radial support part Sr is formed.

Figure 13:
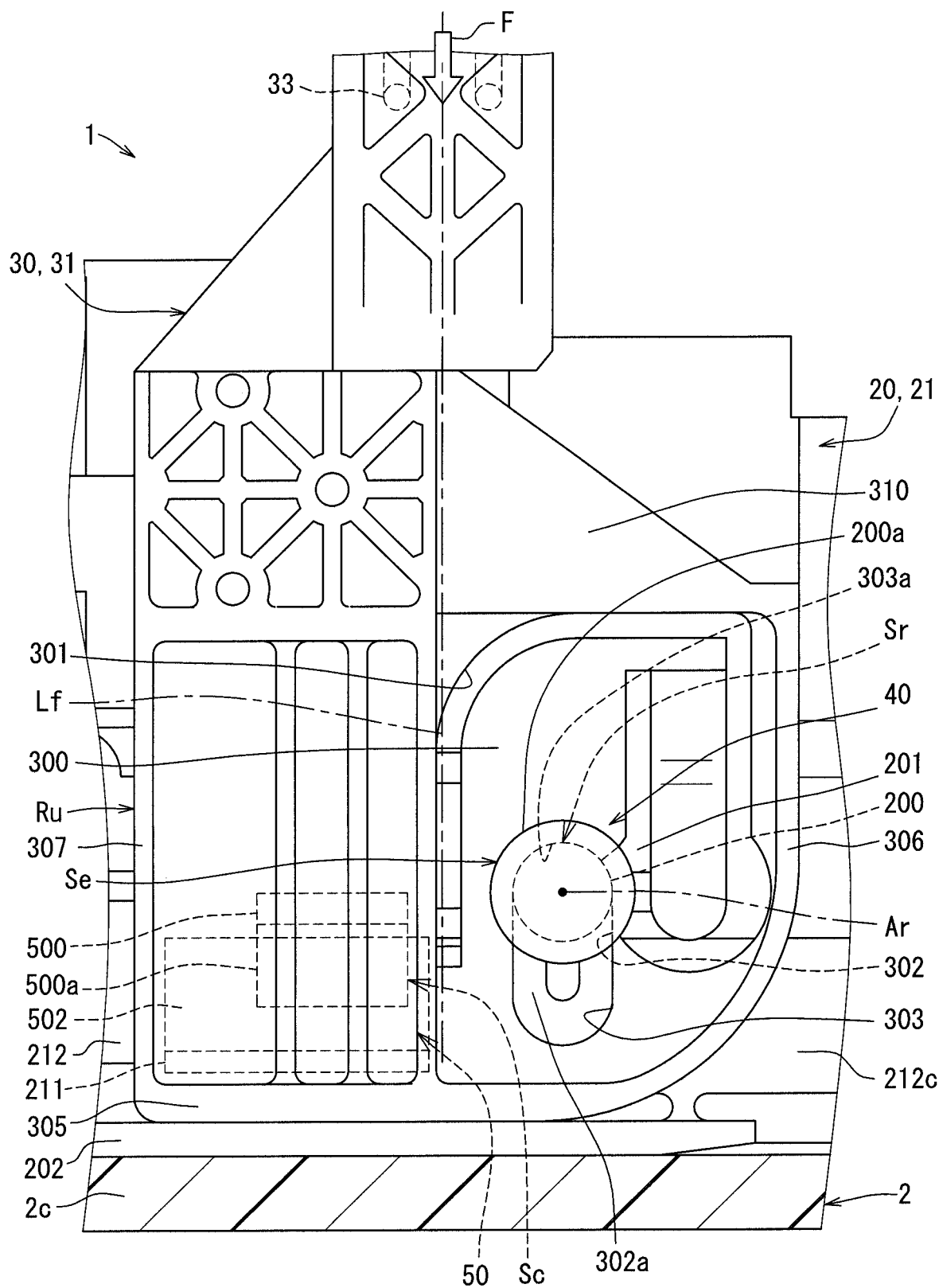
FIG. 13 is a front view showing a modification of FIG. 5.
Figure 14:
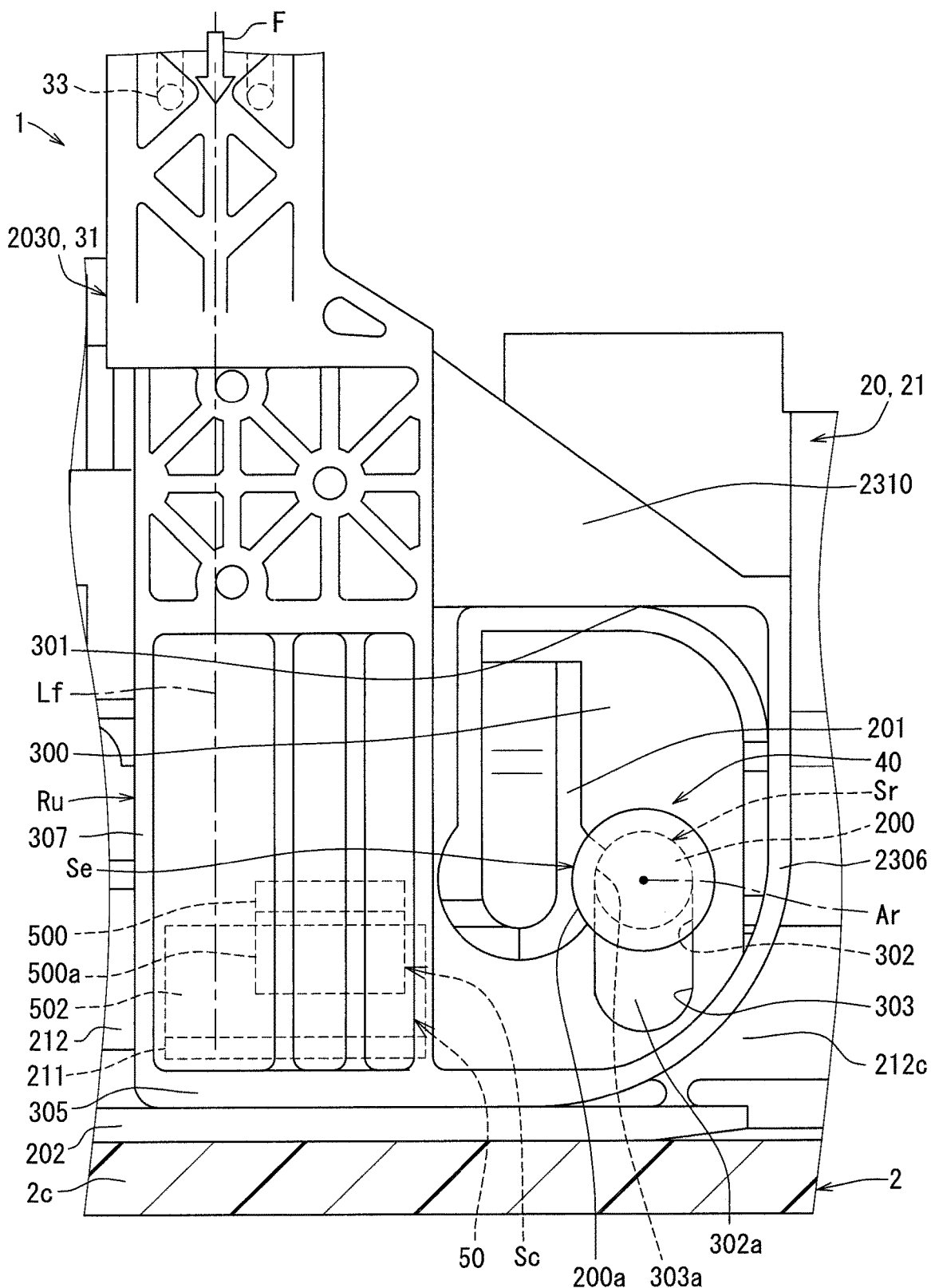
FIG. 14 is a front view showing a modification of FIG. 10.

As a fifth modification with respect to the first embodiment, as shown in FIG. 13, the line of action Lf of the restoring force F may extend at a location between the radial support part Sr and the contact part Sc like in the second embodiment. As a sixth modification with respect to the second embodiment, as shown in FIG. 14, the line of action Lf of the restoring force F may be displaced from the location between the radial support part Sr and the contact part Sc like in the first embodiment. As a seventh modification with respect to the first and second embodiments, the contact part Sc may be provided at a location that is spaced from the peripheral edge part 307 toward the rotational axis Ar.

Figure 15:
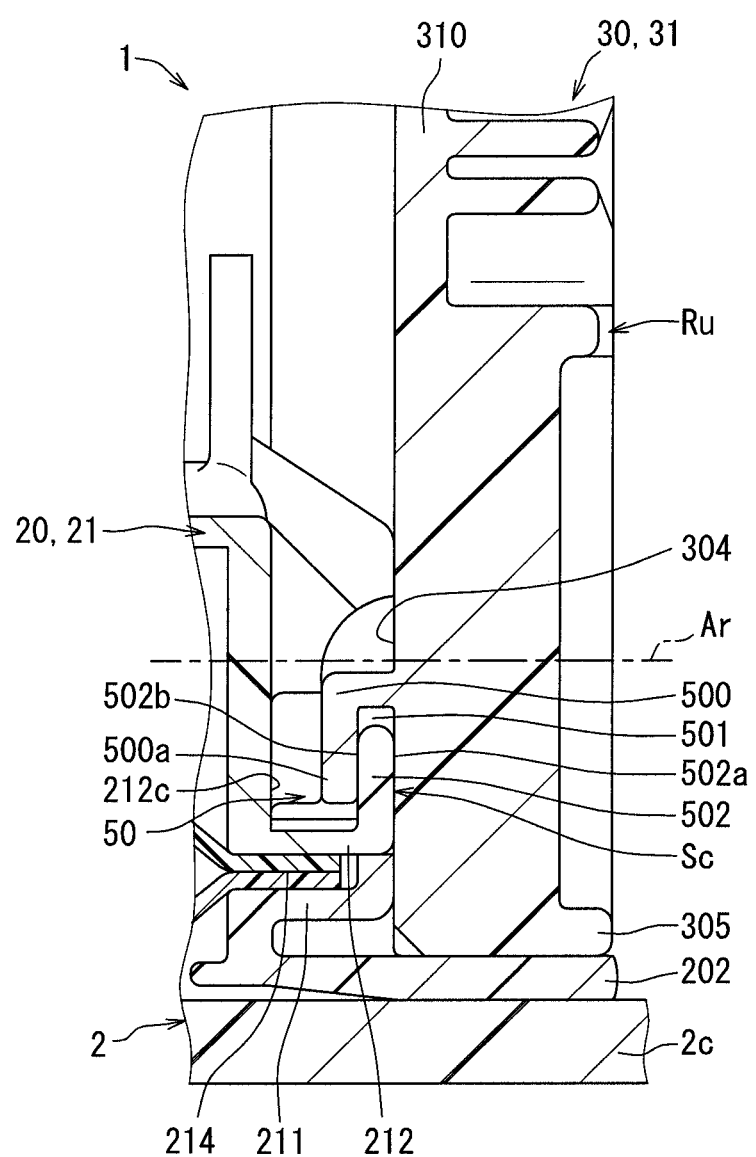
FIG. 15 is a front view showing a modification of FIG. 7.
Figure 16:
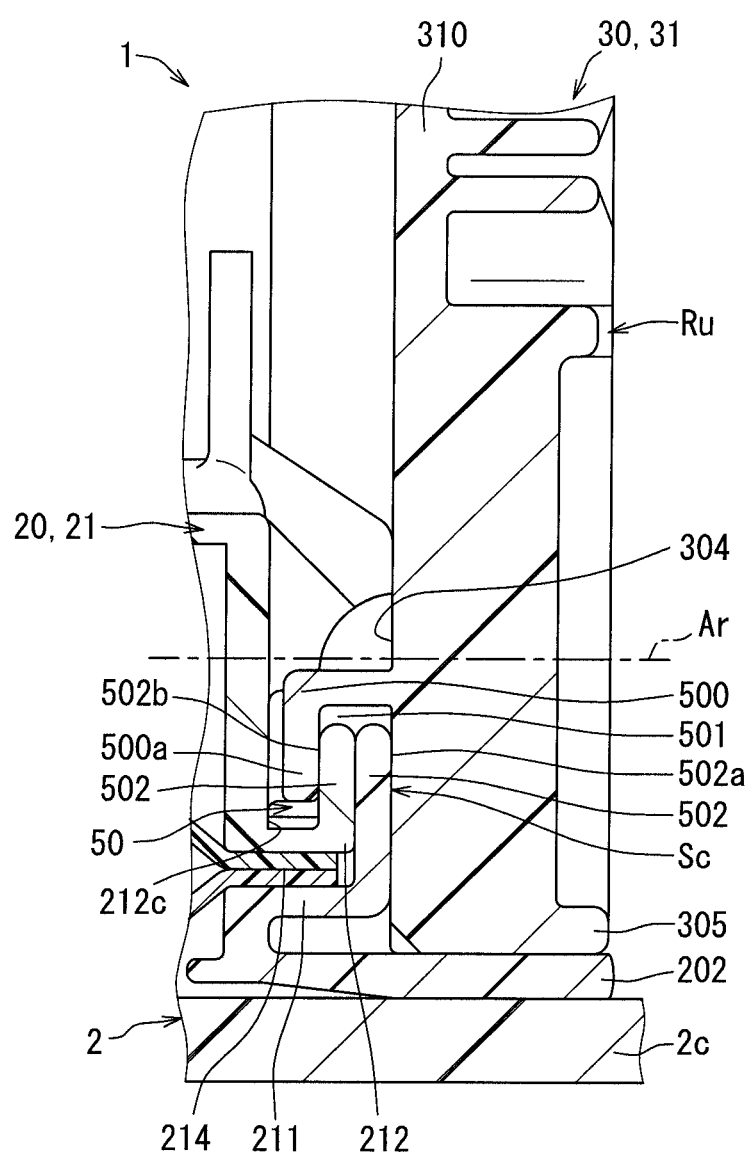
FIG. 16 is a cross-sectional view showing a modification of FIG. 7.

As an eighth modification with respect to the first and second embodiments, as shown in FIGS. 15 and 16, the lock projection 502 may project from the lateral section 212c of the upper member 212 of the unit main body 21 of the pump unit 20. Particularly, in the case of the eighth modification shown in FIG. 16, the lock projection 502, which projects from the upper member 212, and the lock projection 502, which projects from the lower member 211, are both fitted into the gap 501 between the support lateral surface 304 and the lock claw 500 at the operating rotational position Ru.

Figure 17:
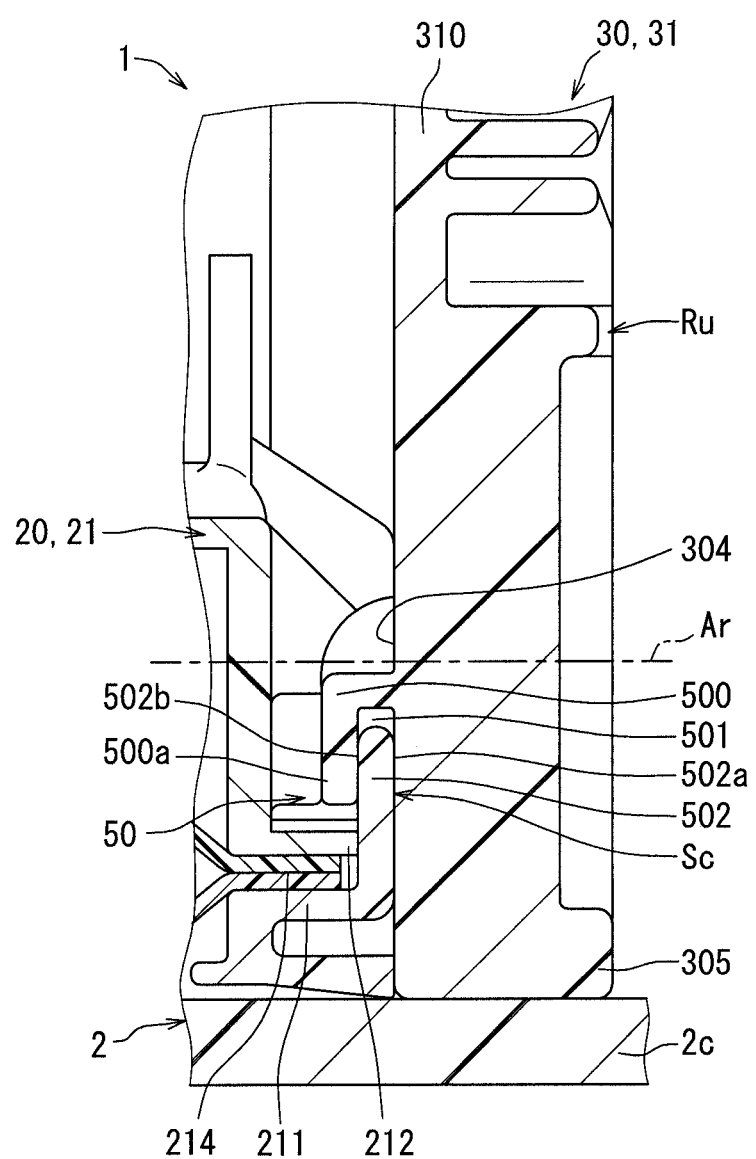
FIG. 17 is a front view showing a modification of FIG. 7.

As a ninth modification with respect to the first and second embodiments, as shown in FIG. 17, the interposing portion 202 may be eliminated from the pump unit 20. As a tenth modification with respect to the first and second embodiments, the lock claw 500 may be provided as one of a plurality of lock claws 500, and the lock projection 502 may be provided as one of a plurality of lock projections 502.

The invention claimed is:

1. A fuel supply device that is configured to supply fuel from an inside of a fuel tank to an internal combustion engine, the fuel supply device comprising:
    a cover body that is installed to an upper wall of the fuel tank;
    a pump unit, in which one of a rotatable shaft portion and a support inner peripheral surface is formed to extend along a rotational axis that extends in a transverse direction, wherein a bottom of the pump unit is configured to be placed on a bottom wall of the fuel tank, and the pump unit is configured to discharge the fuel, which is in the inside of the fuel tank, toward the internal combustion engine;
    a coupling stay, in which another one of the rotatable shaft portion and the support inner peripheral surface is formed to extend along the rotational axis, wherein:
        the coupling stay couples between the cover body and the pump unit;
        the another one of the rotatable shaft portion and the support inner peripheral surface provides radial support to the one of the rotatable shaft portion and the support inner peripheral surface;
        a support lateral surface of the coupling stay, which extends in a longitudinal direction of the coupling stay, provides thrust support to the pump unit; and
        the another one of the rotatable shaft portion and the support inner peripheral surface extends from the support lateral surface in the transverse direction;
    a lock claw that projects from the coupling stay; and
    a lock projection that projects from the pump unit and is operable to lock rotation of the pump unit relative to the coupling stay about the rotational axis upon fitting of the lock projection between the support lateral surface and the lock claw, wherein in a state where the lock projection is fitted between the support lateral surface and the lock claw while the bottom of the pump unit is placed on the bottom wall of the fuel tank, a contact surface of the lock projection, which contacts the support lateral surface, is entirely placed on a side of the rotational axis where the bottom wall of the fuel tank is placed in the longitudinal direction of the coupling stay.

2. The fuel supply device according to claim 1, wherein the coupling stay includes a resilient support portion, which is provided to the another one and is resiliently deformable.

3. The fuel supply device according to claim 1, wherein the rotatable shaft portion, which is formed as the one in the pump unit and extends along the rotational axis, is fitted to a radially inner side of the support inner peripheral surface that is formed as the another one at the coupling stay.

4. The fuel supply device according to claim 3, wherein the support inner peripheral surface is formed by an inner peripheral surface of an elongated hole that forms a space on a side of the rotatable shaft portion, at which the bottom wall is placed, in the coupling stay.

5. The fuel supply device according to claim 3, wherein:
a diameter of the rotatable shaft portion is increased at a distal end part of the rotatable shaft portion located at a projecting side of the rotatable shaft portion; and
the distal end part of the rotatable shaft portion is engaged to the coupling stay on an opposite side of the coupling stay that is opposite from the support lateral surface.

6. The fuel supply device according to claim 1, wherein the pump unit includes an interposing portion that is interposed between the bottom wall and the coupling stay.

7. The fuel supply device according to claim 1, further comprising a resilient member that exerts a restoring force against the coupling stay toward the bottom wall, wherein a line of action of the restoring force, which is exerted against the coupling stay, extends between a radial support part of the coupling stay, which supports the pump unit, and the contact part.

8. The fuel supply device according to claim 7, wherein in the coupling stay, the radial support part and the contact part are decentered toward two peripheral edge parts, respectively, between which the rotational axis is interposed in another transverse direction that transverses the rotational axis.

9. The fuel supply device according to claim 1, wherein a height of an uppermost end part of the lock claw in the longitudinal direction is set to be lower than a height of the rotational axis.

* * * * *